United States Patent [19]

Mason

[11] Patent Number: 4,801,353
[45] Date of Patent: Jan. 31, 1989

[54] USE OF CHLOROUS ACID FOR BLEACHING WOOD PULP

[76] Inventor: James A. Mason, P.O. Box 605, Theodore, Ala. 36590

[21] Appl. No.: 50,919

[22] Filed: May 15, 1987

[51] Int. Cl.[4] .......................... D21C 3/18; D21C 3/20
[52] U.S. Cl. ......................................... 162/73; 162/74; 162/76
[58] Field of Search .................. 162/73, 74, 76, 66, 162/67

[56] References Cited

U.S. PATENT DOCUMENTS 1,828,338 10/1931 Neumann .............................. 162/73
2,407,909 9/1946 Vincent et al. ........................ 162/73

FOREIGN PATENT DOCUMENTS 567774 8/1945 United Kingdom .................. 162/73

Primary Examiner—David L. Lacey
Assistant Examiner—Thi Dang
Attorney, Agent, or Firm—George L. Williamson

[57] ABSTRACT

The present invention describes a novel method of bleaching wood pulp by using an aqueous solution containing a salt of lactic acid or citric acid and chlorous acid wherein the aqueous solution is obtained by reacting lactic acid or citric acid and sodium chlorite at a temperature ranging from about 60° F. and about 80° F.

3 Claims, 1 Drawing Sheet

USE OF CHLOROUS ACID FOR BLEACHING WOOD PULP

BACKGROUND OF THE INVENTION

This invention generally relates to the use of chlorous acid for the production of chlorine dioxide in concentrations suitable for use as an oxidizing agent in various industrial processes, more particularly, for bleaching pulp in the paper industry. Other exemplary industrial processes where chlorine dioxide may be used as an oxidizing agent include disinfection in water and wastewater treatment systems to destroy pathogens, as a whitening agent in the paper industry and as a water treatment chemical in the oil recovery industry.

Methods and/or apparatuses for preparing chlorine dioxide have been described in the prior art. Ratigan, in U.S. Pat. No. 4,250,144, described a generating system for chlorine dioxide for use in the water or wastewater treatment industry. Ward et., al in U.S. Pat. No. 4,013,761, described an invention for generating chlorine dioxide including a generation vessel having leak inhibiting solvent weld joints with reducing couplings. Hartshorn, in U.S. Pat. No. 4,104,190, described a system of generating chlorine dioxide from aqueous liquids containing alkali metal or alkaline earth metal chlorites, and compounds which liberate chlorine in water. Rapson et al., in U.S. Pat. No. 4,534,952, described a small scaled generator of chlorine dioxide for water treatment. Rosenblatt et al., in U.S. Pat. No. 4,504,442, described a use of chlorine dioxide gas as a chemosterilizing agent particularly involving gas impermeable surfaces of implements commonly employed in the medical sciences. Callerame, in U.S. Pat. No. 3,754,079, described a process of preparing chlorine dioxide for use in the bleaching of wood pulp, fats, oils and flour. Capuano et al., in U.S. Pat. No. 4,542,008, described an electochemical process for producing chlorine dioxide from an aqueous solution of sodium chlorite. Hicks, in U.S. Pat. No. 4,590,057, described a process for the generation of chlorine dioxide from an aqueous solution of a metal chlorite and an oxidizing agent, preferably gaseous chlorine.

However, none of the prior art cited above discloses the unique method of preparing chlorine dioxide from chlorous acid for use for pulp bleaching as disclosed in the present invention.

SUMMARY OF THE INVENTION

One of the primary objectives and advantages of the present invention is that it allows for the formation of chlorous acid in an aqueous solution using bulk quantity reactants which allows for the production of a source of the chlorine dioxide off site rather than on-site at the particular industrial installation of importance. Off site production is important because it allows for a much safer generating process for chlorine dioxide whereby the risk of fire and explosion are minimized. It is anticipated that the chlorous acid would be shipped to the plant site by, e.g., tank truck or railway tank car. Furthermore, the present invention allows for the mixing and formation of the chlorine dioxide in an aqueous solution involving bulk quantities and mixing ratios which are extremely simple and basic whereby more or less generally lesser-trained personnel can accomplish the production of the chlorine dioxide. This method allows for the delivery of a source of chlorine dioxide to a plant site by merely transporting an aqueous solution by a refrigerated means which is not now done because chlorine dioxide can not be safely transported and therefore is now generally generated on-site.

According to the invention there is provided a method of forming chlorous acid in an aqueous solution from the reaction of lactic acid or citric acid with sodium chlorite to yield a salt of the acid and chlorous acid. This reaction is carried out at a pH <7 and at a temperature of <80° F., in the range of approximately, 60° F. to 80° F. The aqueous solution of chlorous acid formed from the aforementioned reaction is stable and can be safely transported by common carrier, e.g., tank truck or railway tank car, to the plant site.

The aforementioned reaction is the first of a chain of reactions leading to the production of chlorine dioxide which eventually leads to production of oxidized lignin or wood pulp. These further reactions, generally, involve the oxidation of lignin by either chlorous acid, chlorine dioxide or chlorine gas and will be further described by use of chemical equations in the following section of this specification.

Note that it may be feasible to substitute other alkali metal or alkaline earth metal chlorites for sodium chlorite referred to in this specification.

DESCRIPTION OF USE OF CHLOROUS ACID FOR BLEACHING WOOD PULP

Figure 1:
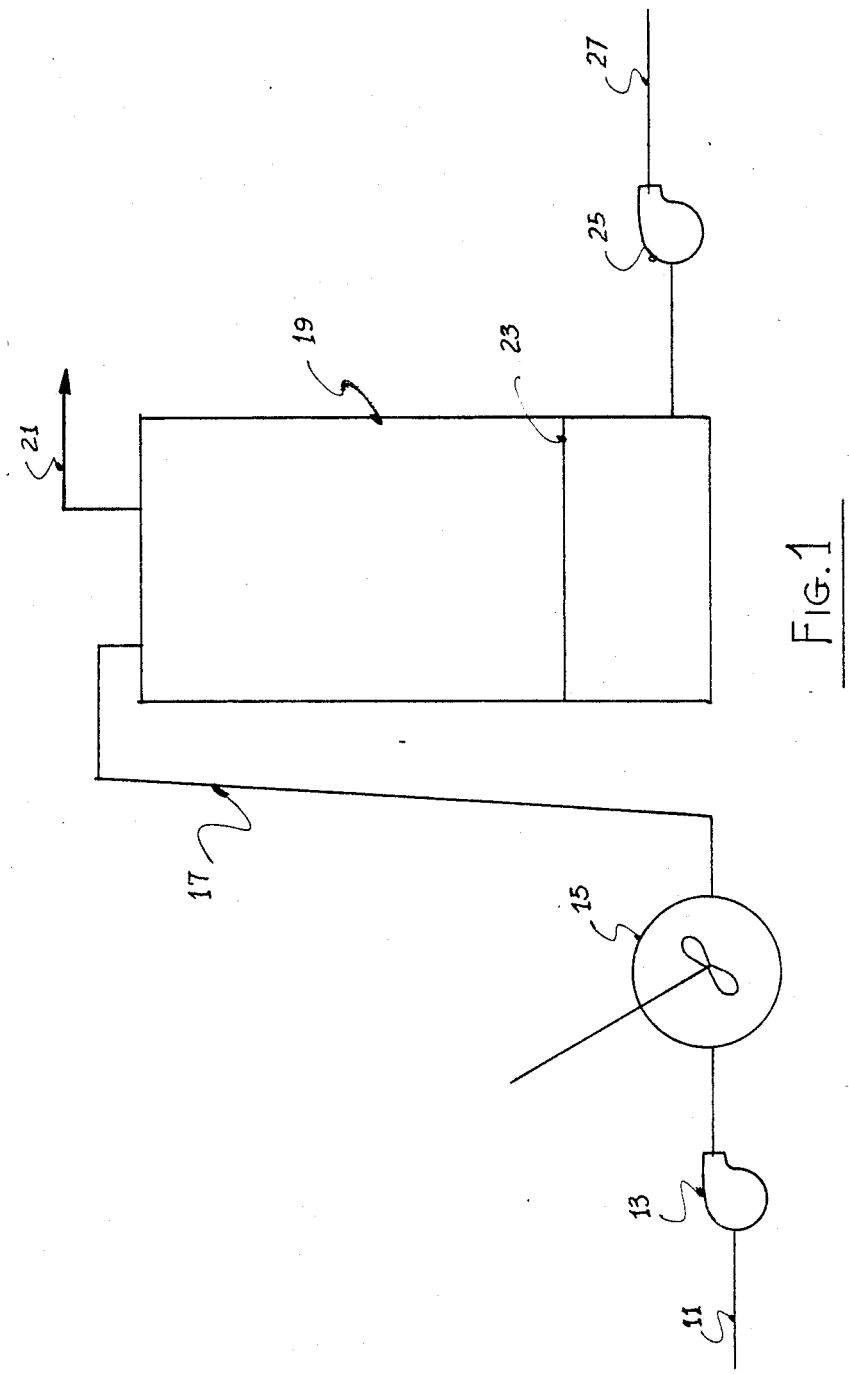
FIG. 1 is a schematic representation of one exemplary process of using the present invention.

A more detailed description of the present invention follows in the form of chemical equations and examples.

The reactions utilized in the method of the present invention are as follows:

$$CH_3CH(OH)COOH + NaClO_2 \longrightarrow \quad 1.$$

(lactic acid)  (sodium chlorite)

$$CH_3CH(OH)COONA + HClO_2$$

(salt of lactic acid)  (chlorous acid)

Citric acid, $HOC(CH_2COOH)_2COOH$, may be substituted for Lactic Acid.

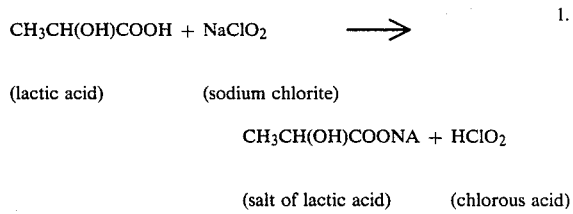

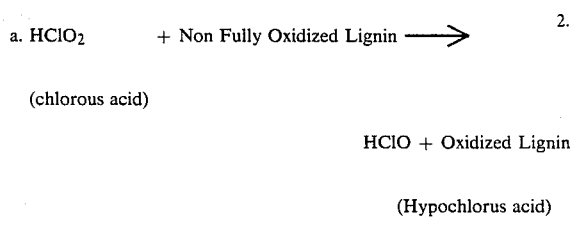

(This reaction occurs in absence of chloride ion)

This reaction 2.b. is not desirable, but it will occur simultaneously with reaction 3., but not necessarily at the same rate.

$$HClO + 2HClO_2 \rightarrow 2ClO_2 + H_2O + HCl \qquad 3.$$

(This reaction occurs in absence of chloride ion)

$$ClO_2 + \text{Lignin} \rightarrow HClO_2 + \text{Oxidized Lignin} \qquad 4.$$

Reaction 3. provides chloride ions, therefore the following reaction occurs:

$$HClO + Cl^- + H^+ \rightleftarrows Cl_2 + H_2O \qquad 5.$$

The Chlorine reaction with Lignin is generally thought to be primarily an Oxidation as follows:

$$Cl_2 + \text{Lignin} \rightarrow \text{Oxidized Lignin} \qquad 6.$$

The above reactions are carried out at a pH less than 7.

In practice, the reactants and reactions are produced by mixing bulk quantities of sodium chlorite and lactic acid. In practice, three parts of sodium chlorite at a concentration of 26% by volume are mixed with one part of lactic acid at a concentration of 88% by volume which is a food grade of lactic acid. The 26% by volume of sodium chlorite and 88% by volume of lactic acid are commonly commercially available bulk quantities of these compounds and are generally provided to industry commercially in either drum lots or bulk quantities for example tank cars or tank trucks. Furthermore, note in the above reaction Number 1. that citric acid, $HOC(CH_2COOH)_2COOH$, may be substituted for the lactic acid to produce a salt of citric acid and chlorus acid in an aqueous solution.

The above reaction Number 1. is accomplished by mixing the reactants together at atmospheric pressure in an aqueous solution with the water temperature being approximately 62° F. being in the range of 60° F. to 80° F. The higher water temperatures nearing 80° F. can be used if necessary to increase the reaction speed. Higher water temperatures may be feasible.

The aqueous solution resulting from reaction number 1 above has a density of about 1.0039, a boiling point of about 101.6° C., a freezing point of about $-3°$ C. and a pH of approximately 4.7. The solution is completely miscible in water, has a pungent odor resembling chlorine and a color of clear to slightly amber.

As can be seen, the results of the present invention can be accomplished by easily mixing on a part to part basis commonly available commercial products in commonly available commercial quantities so as to produce the desired reactions. Granulated sodium chlorite can also be used to make up the bulk quantity of this aqueous solution.

In this specification the terms lignin and wood pulp are used interchangeably as are the terms bleaching, whitening and oxidizing either lignin or wood pulp.

The above reactions produces aqueous solutions containing very high concentrations of chlorine dioxide ranging from generally 5000 ppm to 80,000 ppm. Furthermore, the chlorine dioxide produced by the present invention appears to have more bleaching power on a per unit basis than chlorine dioxide produced by other methods.

Turning to FIG. 1, one exemplary process schematic for using the present invention to bleach wood pulp is shown. At 11, a slurry of wood pulp and water is carried in the process line, heat being supplied to raise the slurry temperature to about 150°-170° F. with the pressure being about 90-110 psi. A pump is shown at 13. A mixing vessel is shown at 15 where the injection of an aqueous solution of a salt of lactic or citric acid and chlorous acid occurs with the pressure being about 90-110 psi and the temperature about 150°-170° F. with the pH being about 3.8-4.2. The preretention tube is shown at, 17, which carries the slurry mixture into a downflow bleaching tower, 19. A vent to carry off gases is shown at 21. The pressure in the tower is about atmospheric and the average temperature is about 150°-170° F. with the pH being about 3.8-4.2. Means at 23 is provided for injecting a caustic solution into the slurry mixture to raise the pH to about 7. An overflow pump is provided at 25 and an outflow line at 27.

The invention will now be described by several examples, it being understood, however, that these examples are given by way of illustration and not by way of limitation in that many changes may be effected without affecting in anyway the scope and spirit of this invention as recited in the appended claims.

EXAMPLE 1

The reaction was carried out using one 55 gallon drum by volume of lactic acid at 88%, i.e., food grade, and three 55 gallon drums of 26% sodium chlorite by volume to yield the desired reactions.

The lactic acid and sodium chlorite were first mixed in a large vessel of water having a temperature of approximately 62° F. being at atmospheric pressure.

EXAMPLE 2

Turning to FIG. 1, one exemplary process schematic for using the present invention to bleach wood pulp is shown. At 11, a slurry of wood pulp and water is carried in the process line, heat being supplied to raise the slurry temperature to about 160° F. with the pressure being about 100 psi. A pump is shown at 13. A mixing vessel is shown at 15 where the injection of an aqueous solution of a salt of lactic or citric acid and chlorous acid occurs with the pressure being about 100 psi and the temperature about 160° F. with the pH being about 3.8-4.2. The preretention tube is shown at, 17, which carries the slurry mixture into a downflow bleachng tower, 19. A vent to carry off gases is shown at 21. The pressure in the tower is about atmospheric and the average temperature is about 150° F. with the pH being about 3.8-4.2. Means at 23 is provided for injecting a caustic solution into the slurry mixture to raise the pH to about 7. An outflow pump is provided at 25 and an outflow line at 27.

EXAMPLE 3

A granulated Sodium Chlorite was dissolved in water to form a 48% sodium chlorite solution according to standard published data on solubility of Sodium Chlorite. This solution was then combined with a solution of 88% lactic acid. An immediate reaction occurred forming a deep brown solution. This solution was tested and the presence of $ClO_2$ was detected. No attempt was made to ascertain the $ClO_2$ ppm of this solution.

EXAMPLE 4

The same steps were taken as in Example 3 using 2 parts sodium chlorite, 1 part lactic acid, 4 parts water at approximately 60° F. Again the reaction showed the presence of $ClO_2$ after reaction in a closed vessel for approximately 30 minutes.

EXAMPLE 5

The same steps were used as in Example 4 except the water was heated to a maximum temperature of approximately 120° F. The reaction appeared to take place much faster.

EXAMPLE 6

A commercially available 26% solution of sodium chlorite was used with 88% lactic acid solution on a one to one basis. The same reaction was observed as in Example 3.

EXAMPLE 7

Same as Example 6, except 2 parts sodium chlorite 26% to 1 part lactic acid to 10 parts water at approximately 60° F. This formed a solution containing Chlorine Dioxide in excess of 80,000 ppm according to accepted tests.

EXAMPLE 8

Same as Example 7, except 2½ parts of sodium chlorite 26% was used to 1 part lactic acid to 10 parts water at approximately 60° F. with approximately the same results as Example 7.

EXAMPLE 9

Same as Example 8, except 3 parts sodium chlorite 26% to 1 part lactic acid 88% to 50 parts water at 60° F. This solution formed a solution containing 5000 plus or minus ppm $ClO_2$.

EXAMPLE 10

A storage test was conducted where solutions were placed in 12 oz. amber bottles and capped. ⅓ were stored out of sunlight at approximately 72° F., ⅓ placed outside was exposed to sunlight and varying temperatures. ⅓ was placed in refrigerator at approximately 38° F.

Tests were conducted to determine loss of concentration and as expected the solution placed outdoors was the most unstable. The solution at 72° retained its concentration to within 2% plus or minus for at least 60 days at which time tests were discontinued.

The refrigerated solutions tested the same as the ones stored at 72° indoors, and were retained up to 120 days at which time sample tests were discontinued.

EXAMPLE 11

Tests were conducted to determine if larger quantities could be commercially produced.

3 gals of 26% sodium chlorite, 1 gal of 88% lactic acid, 51 gal/water in 55 gal. drums, were combined using the following steps; (1) a 55 gal. drum was filled approximately ⅓ full with water and 1 gal 88% lactic acid added and agitated to mix; (2) 3 gals 26% sodium chlorite added and agitated; (3) drum was then filled with water and capped for 15 minutes; (4) drum uncapped and tested and found to contain $ClO_2$ at 5000 ppm plus or minus 2%.

EXAMPLE 12

Same as Example 11 except 6 gal/sodium chlorite, 2 gals/lactic acid and 47 gals/water were combined to produce a solution containing 10,000+ppm $ClO_2$.

EXAMPLE 13

Same as Example 11 except 8 gals/sodium chlorite, 2½ gals/lactic acid, 44½ gal/water were combined. Test showed 1800 plus or minus 2% ppm $ClO_2$.

It was found that a solution of 10,000 ppm may be stored in drums without loss of appreciable concentrations up to 90 days.

EXAMPLE 14

A test was conducted to determine the bleaching capability of the solution when used on paper pulp. A small quantity of raw pulp was obtained from a large pulp and paper mill. A portion of this was heated to approximately 130° F. placed in a 32 oz. zip loc plastic bag, a small quantity of approximately 8000 ppm $ClO_2$ solution was added and bag sealed. The pulp was kneaded by hand to insure a good mix and allowed to remain unopened for approximately 20 minutes. The results showed a pulp bleached to a brightness of 87 on a brightness scale.

I claim:

1. In a process of bleaching wood pulp including the steps of injecting an aqueous solution into a vessel containing wood pulp the improvement comprising: using as said aqueous solution a solution containing an effective amount for bleaching purposes of a mixture of a salt of lactic acid or citric acid and chlorous acid, wherein said aqueous solution is obtained by reacting lactic acid or citric acid and sodium chlorite, at a temperature ranging from 60° F. to 80° F.

2. A process according to claim 1, wherein said aqueous solution is obtained by reacting one part by volume of 88% lactic acid and 3 parts by volume of 26% sodium chlorite.

3. A process of bleaching wood pulp comprising:
preparing a slurry of wood pulp and water, in a confining vessel;
heating said slurry to a temperature ranging from 150° F. to 170° F. and pressurizing said slurry to a pressure of between 90 psi and 110 psi,
injecting an aqueous solution of a salt of lactic or citric acid and chlorous acid into said slurry while it is at said elevated pressure and said elevated temperature, the amount of aqueous solution which is injected being such that the pH of the resulting composition is between about 3.8–4.2;
thereafter depressurizing and causticizing said slurry to a pH of about 7;
whereby said wood pulp is bleached.

* * * * *